(12) United States Patent
Koo et al.

(10) Patent No.: US 8,774,850 B2
(45) Date of Patent: Jul. 8, 2014

(54) CHANNEL QUALITY INFORMATION TRANSMISSION METHOD IN WIRELESS COMMUNICATION SYSTEM ADOPTING COORDINATED MULTI-POINT SCHEME AND AN APPARATUS THEREFOR

(75) Inventors: Ja Ho Koo, Anyang-si (KR); Wook Bong Lee, Anyang-si (KR); Su Nam Kim, Anyang-si (KR); Bin Chul Ihm, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 13/203,819

(22) PCT Filed: Mar. 5, 2010

(86) PCT No.: PCT/KR2010/001397
§ 371 (c)(1),
(2), (4) Date: Aug. 29, 2011

(87) PCT Pub. No.: WO2010/101440
PCT Pub. Date: Sep. 10, 2010

(65) Prior Publication Data
US 2012/0282966 A1    Nov. 8, 2012

Related U.S. Application Data

(60) Provisional application No. 61/157,917, filed on Mar. 6, 2009.

(30) Foreign Application Priority Data

Nov. 10, 2009   (KR) .......................... 10-2009-0108071

(51) Int. Cl.
*H04B 7/00*   (2006.01)
*H04W 4/00*   (2009.01)

(52) U.S. Cl.
USPC ............................ 455/517; 370/329; 370/334

(58) Field of Classification Search
USPC .................................... 455/517; 370/329, 334
See application file for complete search history.

(56) References Cited

U.S. PATENT DOCUMENTS

| | | | |
|---|---|---|---|
| 2007/0070952 A1* | 3/2007 | Yoon et al. | 370/334 |
| 2009/0010219 A1* | 1/2009 | Lee et al. | 370/329 |
| 2011/0235607 A1* | 9/2011 | Haustein et al. | 370/329 |

FOREIGN PATENT DOCUMENTS

| | | |
|---|---|---|
| KR | 10-2006-0128542 A | 12/2006 |
| KR | 10-2007-0050578 A | 5/2007 |
| KR | 10-2007-0072794 A | 7/2007 |
| KR | 10-2008-0037398 A | 4/2008 |

* cited by examiner

*Primary Examiner* — Ping Hsieh
*Assistant Examiner* — Xin Jia
(74) *Attorney, Agent, or Firm* — Mckenna Long & Aldridge LLP

(57) ABSTRACT

The present invention relates to a channel quality information transmission method in a communication system adopting a coordinated multi-point scheme. A terminal receives signals, through the same band, from a serving base station and at least one neighbor base station, respectively, which are included in a CoMP set operating in a joint processing mode. Next, the terminal generates combined channel quality information on a single signal obtained by combining the signals received through the same band, and then transmits the information to the serving base station. The combined channel quality information is generated using information on a combined channel obtained by combining channels between the terminal and the serving base station and between the terminal and each one of the at least one neighbor base station, which are included in the CoMP set.

5 Claims, 5 Drawing Sheets

CHANNEL QUALITY INFORMATION TRANSMISSION METHOD IN WIRELESS COMMUNICATION SYSTEM ADOPTING COORDINATED MULTI-POINT SCHEME AND AN APPARATUS THEREFOR

This application is a 35 U.S.C. §371 National Stage entry of International Application No. PCT/KR2010/001397, filed on Mar. 5, 2010, and claims the benefit of priority of U.S. Provisional Application No. 61/157,917, filed Mar. 6, 2009, and Korean Patent Application No. 10-2009-0108071, filed Nov. 11, 2009, each of which are hereby incorporated by reference in their entirety as if fully set forth herein.

TECHNICAL FIELD

The present invention relates to a wireless communication system, and more particularly, to a method for transmitting channel quality information which can correctly reflect a channel path through which a UE has received data in the case where a wireless communication system to which a CoMP scheme is applied operates in a joint processing mode.

BACKGROUND ART

Multiple Input Multiple Output (MIMO) has recently attracted much attention as a broadband wireless mobile communication technology. A MIMO system seeks to increase data communication efficiency by use of a plurality of antennas. Depending on whether the same or different data signals are transmitted through antennas, MIMO techniques may be classified into spatial multiplexing and spatial diversity.

In spatial multiplexing, different data signals are transmitted simultaneously through a plurality of Transmission (Tx) antennas such that data can be transmitted at a high rate without increasing a system bandwidth. In spatial diversity, the same data is transmitted through a plurality of Tx antennas, thus achieving transmit diversity. An example of the spatial diversity scheme is space time channel coding.

Depending on whether a receiver feeds back channel information to a transmitter, MIMO techniques may also be classified into open-loop MIMO and closed-loop MIMO. Open-loop MIMO schemes include Bell Labs Layered Space-Time (BLAST) and Space-Time Trellis Coding (STTC). According to BLAST, the transmitter transmits information in parallel and the receiver detects signals by repeating Zero Forcing (ZF) or Minimum Mean Square Error (MMSE) detection such that as much information as the number of Tx antennas can be transmitted. STTC achieves transmit diversity and coding gain by utilizing a space domain. One example of the closed-loop MIMO technique is Transmit Antenna Array (TxAA).

FIG. 1 conceptually illustrates a Coordinated Multi-Point (CoMP) scheme that is applied to a wireless communication system in a multi-cell environment.

Referring to FIG. 1, intra enhanced Node Bs (eNBs) 110 and 120 and an inter eNB 130 are present in a multi-cell environment. In a Long Term Evolution (LTE) system, an intra eNB covers a plurality of cells (or sectors). Cells covered by an eNB to which a User Equipment (UE) belongs are in an intra eNB relationship with the UE. That is, cells covered by the same eNB that manages a cell in which a UE is located are cells corresponding to the intra eNBs 110 and 120, and cells covered by a different eNB from the eNB that manages the serving cell of the UE are cells corresponding to the inter eNB 130.

Cells covered by the same eNB that serves a UE exchange information (e.g. data and Channel State Information (CSI)) through an x2 interface, while cells covered by a different eNB from the serving eNB of the UE exchange inter-cell information via a backhaul 140. As illustrated in FIG. 1, a single-cell MIMO user 150 located in a single cell (or sector) may communicate with one serving eNB in the cell (or sector), and a multi-cell MIMO user 160 located at a cell edge may communicate with a plurality of serving eNBs in a plurality of cells (or sectors).

The CoMP scheme has been proposed to improve the throughput of a user at a cell edge by applying advanced MIMO in a multi-cell environment. Application of the CoMP scheme to a wireless communication system may not only reduce Inter-Cell Interference (ICI) in the multi-cell environment but may also allow a UE to receive joint data support from multi-cell eNBs. Also, each eNB may improve system performance by simultaneously supporting one or more UEs (or Mobile Stations (MSs)) $MS_1, MS_2, \ldots, MS_K$ using the same radio frequency resources. Further, an eNB may implement Space Division Multiple Access (SDMA) based on CSIs between the eNB and UEs.

The CoMP operation mode may be classified into two modes, a joint processing mode which is cooperative MIMO based on data sharing and a Coordinated Scheduling/Beamforming (CS/CB) mode.

In a CoMP wireless communication system, a serving eNB and one or more neighbor eNBs (or Base Stations (BSs)) $BS_1, BS_2, \ldots, BS_M$ are connected to a scheduler over a backbone network. The scheduler receives feedback channel information representing channel states between the UEs MS' to $MS_K$ and the neighbor eNBs $BS_1, BS_2, \ldots, BS_M$, as measured by the eNBs. For example, the scheduler may schedule cooperative MIMO information for the serving eNB and the one or more cooperating eNBs. That is, the scheduler issues a command related to a cooperative MIMO operation directly to each eNB.

However, the current LTE system has not yet defined the criteria or rule based on which a UE measures and generates channel quality information in the case where a wireless communication system to which a CoMP scheme is applied operates in a joint processing mode. In this case, the conventional individual channel quality information between a UE and each eNB that transmits data is not appropriate for the joint processing mode. Therefore, in the following description, the present invention will define a channel quality information format for clearly or accurately reflecting a combination of channels through which data is transmitted in the joint processing mode and will also disclose embodiments using the channel quality information format.

DISCLOSURE

Technical Problem

An object of the present invention devised to solve the problem lies in a method and apparatus for transmitting channel quality information, wherein channel paths of the same band through which data is transmitted from one or more eNBs to a UE are accurately reflected in channel quality information to improve reliability in the case where a CoMP communication system operates in a joint processing mode.

Technical Solution

The object of the present invention can be achieved by providing a method for transmitting channel quality information from a user equipment (UE) in a communication system to which a Coordinated Multi-Point (CoMP) scheme is applied, the method including receiving signals through an identical band from a serving eNode B (eNB) and one or more neighbor eNBs that are included in a CoMP set and operate in a joint processing mode, generating combined channel quality information of one signal which combines the signals received through the identical band, and transmitting the combined channel quality information to the serving eNB.

Here, the combined channel quality information is generated using combined channel information of a combination of channels between the UE and the serving eNB and the one or more neighbor eNBs included in the CoMP set. Preferably, the combined channel quality information $CQI_c$ is determined according to $$CQI_c = \frac{|h_1 + h_2 + \ldots + h_n|^2}{N + \sum_{\substack{k=0 \\ k=1,2,\ldots,n}}^{M} I_k} = \frac{|h_c|^2}{N + \sum_{\substack{k=0 \\ k=1,2,\ldots,n}}^{M} I_k},$$

where $|h_1+h_2+ \ldots +h_n|^2$ or $|h_c|^2$ is the combined channel information, N is noise received by the UE, and $$\sum_{\substack{k=0 \\ k=1,2,\ldots,n}}^{M} I_k$$

is a sum of interferences between the UE and neighbor eNBs excluding the eNBs included in the CoMP set.

More preferably, the CoMP set is generated by receiving information of a CoMP candidate set including one or more neighbor eNBs from a serving eNB and identifying the neighbor eNBs included in the CoMP candidate set as one or more CoMP sets, each including a preset number of neighbor eNBs.

In this case, the method further includes receiving information of a CoMP transmission indication set among the one or more CoMP sets from the serving eNB after transmitting combined channel quality information of the one or more CoMP sets, measuring precoding matrix indices corresponding respectively to neighbor eNBs included in the CoMP transmission indication set, and transmitting the precoding matrix indices to the serving eNB. Here, the CoMP transmission indication set is a CoMP set that is selected from among the CoMP sets based on the combined channel quality information.

In another aspect of the present invention, provided herein is a user equipment (UE) apparatus in a communication system to which a Coordinated Multi-Point (CoMP) scheme is applied, the UE apparatus including a reception module for receiving signals through an identical band from a serving eNB and one or more neighbor eNBs that are included in a CoMP set and operate in a joint processing mode, a processor for generating combined channel quality information of one signal which combines the signals received through the identical band, and a transmission module for transmitting the combined channel quality information to the serving eNB.

In this case, the combined channel quality information is generated using combined channel information of a combination of channels between the UE and the serving eNB and the one or more neighbor eNBs included in the CoMP set.

More preferably, the combined channel quality information $CQI_c$ is determined according to $$CQI_c = \frac{|h_1 + h_2 + \ldots + h_n|^2}{N + \sum_{\substack{k=0 \\ k=1,2,\ldots,n}}^{M} I_k} = \frac{|h_c|^2}{N + \sum_{\substack{k=0 \\ k=1,2,\ldots,n}}^{M} I_k},$$

where $|h_1+h_2+ \ldots +h_n|^2$ or $|h_c|^2$ is the combined channel information, N is noise received by the UE, and $$\sum_{\substack{k=0 \\ k=1,2,\ldots,n}}^{M} I_k$$

is a sum of interferences between the UE and neighbor eNBs excluding the eNBs included in the CoMP set.

Advantageous Effects

If the method and apparatus for transmitting channel quality information according to the present invention is used, channel paths of the same band through which data is transmitted from one or more eNBs to a UE can be accurately reflected in channel quality information to improve reliability.

BEST MODE

Figure 1:
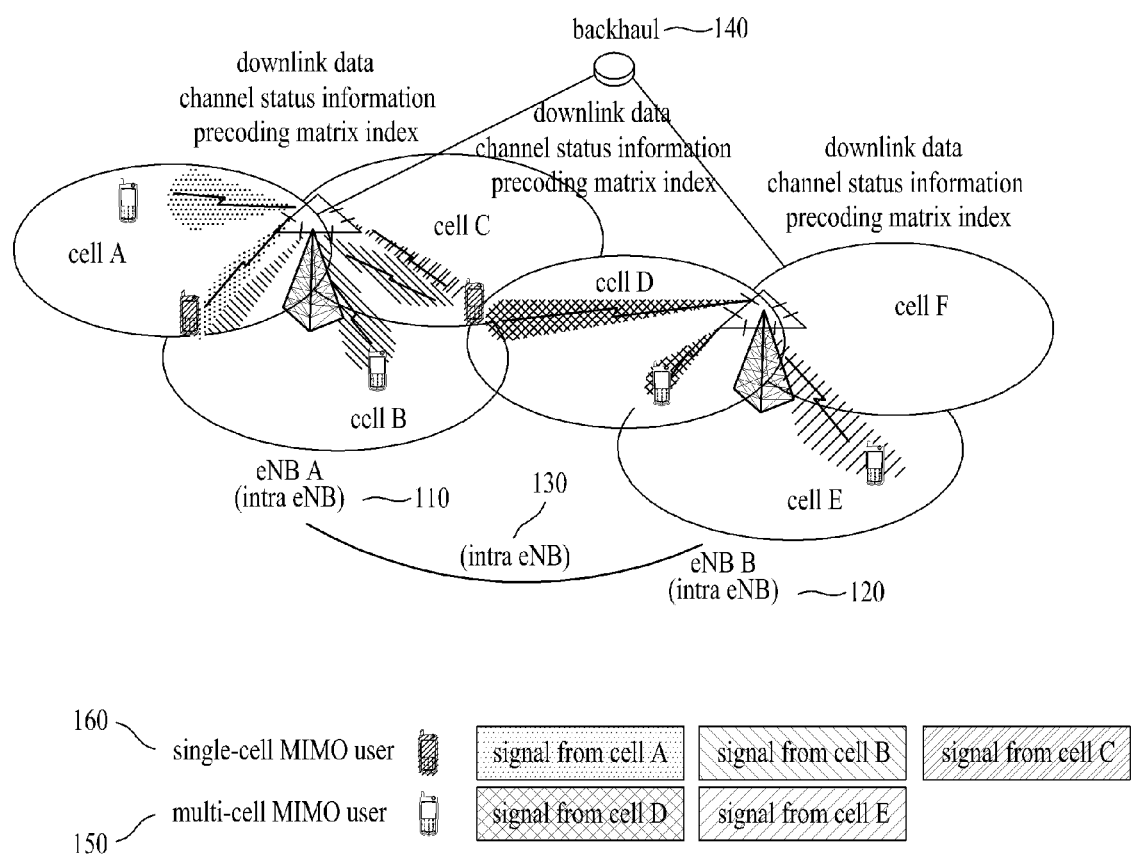
FIG. 1 conceptually illustrates a Coordinated Multi-Point (CoMP) scheme applied to a wireless communication system under a multi-cell environment.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. The same reference numbers will be used throughout this specification to refer to the same or like parts.

It should be noted that the terms and words used in the present specification and claims should not be construed as being limited to common or dictionary meanings but instead should be understood to have meanings and concepts in agreement with the spirit of the present invention based on the principle that an inventor can define the concept of each term suitably in order to describe his/her own invention in the best way possible.

According to the present invention, the term "cell" or "sector" refers to a space that is under control of an enhanced Node B (eNB). Although the present invention will be described with reference to an example in which each eNB controls one cell or sector for ease of explanation, the present invention is not necessarily limited to this example and each eNB may control a plurality of cells or sectors.

In the present invention, the term "CoMP set" refers to a set of serving and neighbor eNBs that operate in a CoMP mode in a wireless communication system.

In the joint processing mode, which is a CoMP operation mode, a serving eNB and one or more neighbor eNBs included in a CoMP set transmit data through the same band to a UE in order to improve data transfer rate at cell boundaries. The joint processing mode has been initially proposed in an effort to transform signals which serve as interference from the viewpoint of the UE, i.e., signals received from neighbor eNBs, into data transmission signals. In the case of the joint processing mode, precoding matrix indices and channel quality information transmitted from the UE as feedback information and data transmitted from eNBs included in a CoMP set to the UE are shared between the eNBs included in the CoMP set, i.e., between the serving eNB and neighbor eNBs, through a backhaul link.

In the joint processing mode, although the UE receives data individually from the eNBs included in the CoMP set, it can be assumed that data is received from one transmission point from the viewpoint of the UE since data has been transmitted through the same frequency band. Therefore, in the joint processing mode, combined channel quality information, which is measured based on a combination of individual channels through which the UE receives data, can more efficiently represent the downlink channel.

First, let us assume that one serving eNB and one neighbor eNB constitute a CoMP set and operate in a joint processing mode and a UE is located at a cell boundary of the serving eNB such that the UE receives the same data through the same frequency band from both the serving eNB and the neighbor eNB.

In this case, channel quality information of each channel between the UE and the eNBs included in the CoMP set, which can be measured by the UE, may be represented as the following Expressions 1 and 2. Specifically, Expression 1 represents channel quality information of the channel between the UE and the serving eNB and Expression 2 represents channel quality information of the channel between the UE and the neighbor eNB.

$$CQI_1 = \frac{|h_1|^2}{N + \sum_{\substack{k=0 \\ k \neq 1}}^{M} I_k}$$ [Expression 1]

$$CQI_2 = \frac{|h_2|^2}{N + \sum_{\substack{k=0 \\ k \neq 2}}^{M} I_k}$$ [Expression 2]

Here, is $|h_1|^2$ channel information between the UE and the serving eNB and $|h_2|^2$ is channel information between the UE and the neighbor eNB which operates in the joint processing mode. N is noise received from the UE and $$\sum_{\substack{k=0 \\ k=1,2,\ldots,n}}^{M} I_k$$

is the sum of interferences between the UE and eNBs excluding the eNBs included in the CoMP set from among the neighbor eNBs.

As described above, in the joint processing mode, it can be assumed that data is received from one transmission point since eNBs included in a CoMP set transmit data through the same frequency band. That is, since it can be assumed that the UE receives data through a channel which combines a channel between the UE and the serving eNB and channels between the UE and neighbor eNBs which operate in the joint processing mode, the single combined channel information is more meaningful than individual channel information of each channel.

However, Expression 1 and Expression 2 do not reflect the combined channel. First, referring to Expression 1, a signal that the UE receives from the neighbor eNB is regarded as an interference signal. Similarly, referring to Expression 2, a signal that the UE receives from the serving eNB is also regarded as an interference signal. The simple sum of the values of Expressions 1 and 2 can represent channel quality information of the combined channel only when the channels are not associated with each other and does not correctly or accurately reflect a downlink channel of the CoMP communication system which operates in the joint processing mode. The following Expression 3 represents combined channel quality information that is proposed by the present invention.

$$CQI_c = \frac{|h_1 + h_2|^2}{N + \sum_{\substack{k=0 \\ k \neq 1,2}}^{M} I_k} = \frac{|h_c|^2}{N + \sum_{\substack{k=0 \\ k \neq 1,2}}^{M} I_k}$$ [Expression 3]

Here, $|h_1+h_2|^2$ 또는 $|h_c|^2$ denote combined channel information of a channel between the UE and the serving eNB and a channel between the UE and the neighbor eNB. Specifically, referring to the denominator in Expression 3, it can be seen that the UE does not determine that the signal received from the neighbor eNB is an interference signal, unlike Expression 1. Similarly, referring to the denominator in Expression 3, it can be seen that the UE does not determine that the signal received from the serving eNB is an interference signal, unlike Expression 2. That is, $CQI_c$ Expression 3 denotes channel quality information in the case where the UE receives data through one channel (i.e., the combined channel) from a single transmission point.

While it is assumed in Expression 3 that the number of neighbor eNBs is 1, Expression 3 can be generalized by the following Expression 4. In Expression 4, $|h_1+h_2+\ldots+h_n|^2$ or $|h_c|^2$ denotes combined channel information of a channel between the UE and the serving eNB and channels between the UE and the neighbor eNBs. In Expression 4, it is assumed that one serving eNB and one or more neighbor eNBs are included in a CoMP set and the eNBs transmit the same data to the UE. Here, referring to the denominator of Expression 4, it is assumed that only signals that the UE receives from eNBs excluding neighbor eNBs included in the CoMP set from among all neighbor eNBs are regarded as interference signals.

$$CQI_c = \frac{|h_1 + h_2 + \ldots + h_n|^2}{N + \sum_{\substack{k=0 \\ k=1,2,\ldots,n}}^{M} I_k} = \frac{|h_c|^2}{N + \sum_{\substack{k=0 \\ k=1,2,\ldots,n}}^{M} I_k} \quad \text{[Expression 4]}$$

Although it is assumed in the above example that the eNBs included in the CoMP set transmit the same data to the UE, combined channel quality information may also be measured when the eNBs transmit different data. In this case, the number of combined channel quality information (or information values) is determined based on the number of codewords transmitted from the eNBs. That is, in the case where N eNBs transmit different data using a single codeword, the UE only needs to measure one combined channel quality information value since the different data can be regarded as being transmitted through one combined channel. On the other hand, in the case where N eNBs transmit different data using M codewords, the UE can measure M combined channel quality information values since the different data can be regarded as being transmitted through M combined channels.

Figure 2:
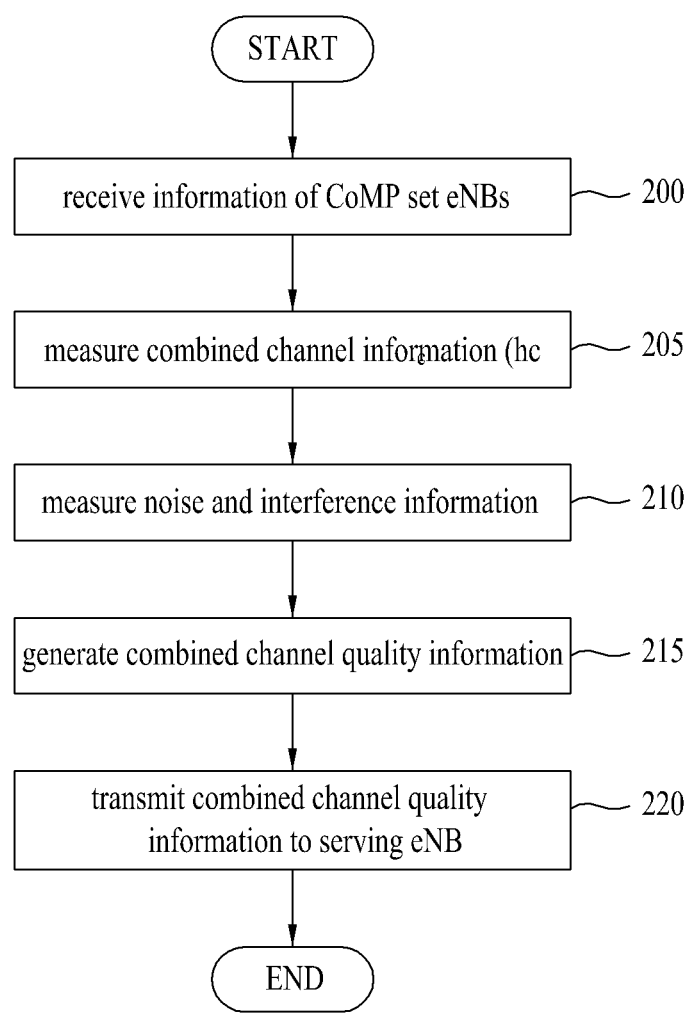
FIG. 2 is a flowchart illustrating a method for transmitting combined channel quality information of a UE according to an embodiment of the present invention.

FIG. 2 is a flowchart illustrating a method for transmitting combined channel quality information according to an embodiment of the present invention.

As shown in FIG. 2, in step 200, a UE receives information regarding eNBs included in a CoMP set from a serving eNB. Here, the CoMP set includes the serving eNB and one or more neighbor eNBs which can operate in the joint processing mode.

Then, in step 205, the UE measures combined channel information ($|h_1+h_2+ \ldots +h_n|^2$ or $|h_c|^2$) of a channel between the UE and the serving eNB and channels between the UE and the eNBs included in the CoMP set. That is, the UE receives data from the eNBs (i.e., the serving and neighbor eNBs) included in the CoMP set in a joint processing mode. Here, the data can be regarded as being received through a combined channel from one transmission point from the viewpoint of the UE. In step 210, the UE measures received noise and interferences. Here, the interferences are signals that the UE receives from eNBs other than the eNBs included in the CoMP set.

Then, the UE generates combined channel quality information of channel information items in step 215 and transmits the generated combined channel quality information to the serving eNB in step 220. Here, the combined channel quality information is preferably generated according to the above Expression 4.

More specifically, referring to the numerator of Expression 4, combined channel quality information $|h_1+h_2+ \ldots +h_n|^2$ or $|h_c|^2$ of a channel between the UE and the serving eNB and channels between the UE and the eNBs of the CoMP set represent the reception power of a reference signal of magnitude 1 received through a combined channel. In addition, referring to the denominator of Expression 4, N denotes noise power received by the UE, and $$\sum_{\substack{k=0 \\ k=1,2,\ldots,n}}^{M} I_k$$

is the sum of interference powers between the UE and eNBs excluding the eNBs included in the CoMP set from among the neighbor eNBs. That is, $CQI_c$ can be expressed as a ratio of the sum of powers of data received through the combined channel to noise and interference powers received by the UE.

In the following, a method for setting a CoMP transmission indication set in a wireless communication system to which a CoMP scheme is applied is described as an embodiment of the method of using combined channel quality information described above.

In this embodiment, the term "associated information" or "associated information item" refers to information regarding the level of interference from a neighbor eNB which has an influence upon communication between UEs and the serving eNB.

In addition, in this embodiment, the term "CoMP candidate set" refers to a set of neighbor eNBs appropriate for application to the CoMP scheme from among given neighbor eNBs and "CoMP group" refers to a set of eNBs that are identified together with the serving eNB as a preset number of eNBs from among neighbor eNBs included in the CoMP candidate set. Here, the preset number is the number of eNBs that transmit data when the UE operates in the joint processing mode.

Further, in this embodiment, the term "CoMP transmission indication set (or CoMP Tx indication set)" refers to an eNB group selected by the serving eNB from among CoMP groups in the joint processing mode.

Methods of selecting neighbor eNBs to be included in a CoMP candidate set may include a method in which neighbor eNBs are selected based on information measured in UEs and a method in which the serving eNB internally selects neighbor eNBs without exchanging information with UEs. Although this embodiment is associated with the neighbor eNB selection method in which neighbor eNBs to be included in a CoMP candidate set are selected based on information measured in UEs, it will be apparent to those skilled in the art that the present invention is also applicable to the method in which the serving eNB internally selects neighbor eNBs to be included in a CoMP candidate set.

Figure 3:
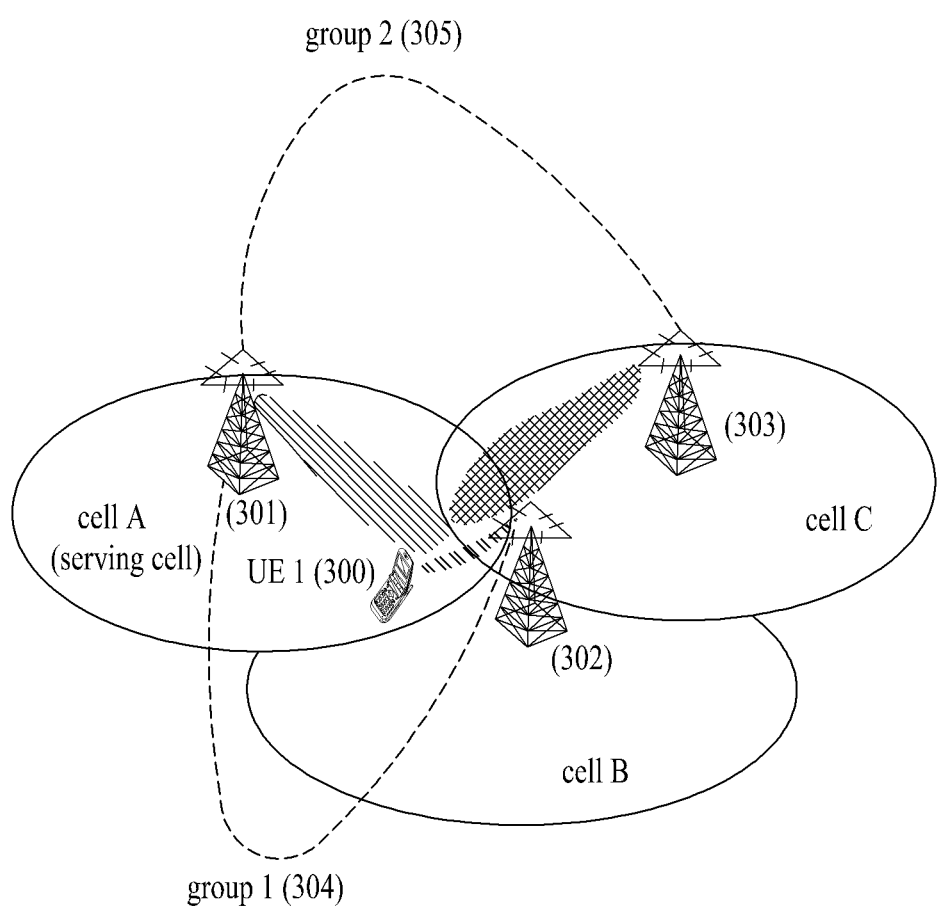
FIG. 3 conceptually illustrates a wireless communication system according to an embodiment of the present invention.

FIG. 3 conceptually illustrates a wireless communication system according to an embodiment of the present invention.

As shown in FIG. 3, a User Equipment (UE) 300 receives information regarding neighbor eNBs included in a CoMP candidate set from a serving eNB A 301. In this embodiment, it is assumed that a neighbor eNB B 302 and a neighbor eNB C 303 are provided as a CoMP candidate set.

The UE 300 identifies (or defines) each of the serving eNB A 301 and the neighbor eNBs 302 and 303 included in the CoMP candidate set as belonging to a CoMP group including a preset number of eNBs. In this embodiment, assuming that the preset number is 2, the UE 300 identifies the serving eNB A 301 and the neighbor eNB 302 as eNBs of a first CoMP group and identifies the serving eNB A 301 and the neighbor eNB C 302 as eNBs of a second CoMP group. That is, in the case where the UE operates in a joint processing mode, the UE receives data from the eNBs included in the first CoMP group or receives data from the eNBs included in the second CoMP group and therefore a combination of the channels between the UE and the eNBs, rather than each of the channels between the UE and the eNBs, reflects an actual data transmission path of the joint processing mode.

Accordingly, the UE 300 measures first combined channel quality information associated with the first CoMP group and second combined channel quality information associated with the second CoMP group and transmits the measured first and second combined channel quality information to the serving eNB A 301. Then, based on the first and second combined channel quality information, the serving eNB A 301 sets a CoMP group more appropriate for the joint processing mode from among the first and second CoMP groups as a CoMP transmission indication set.

Figure 4:
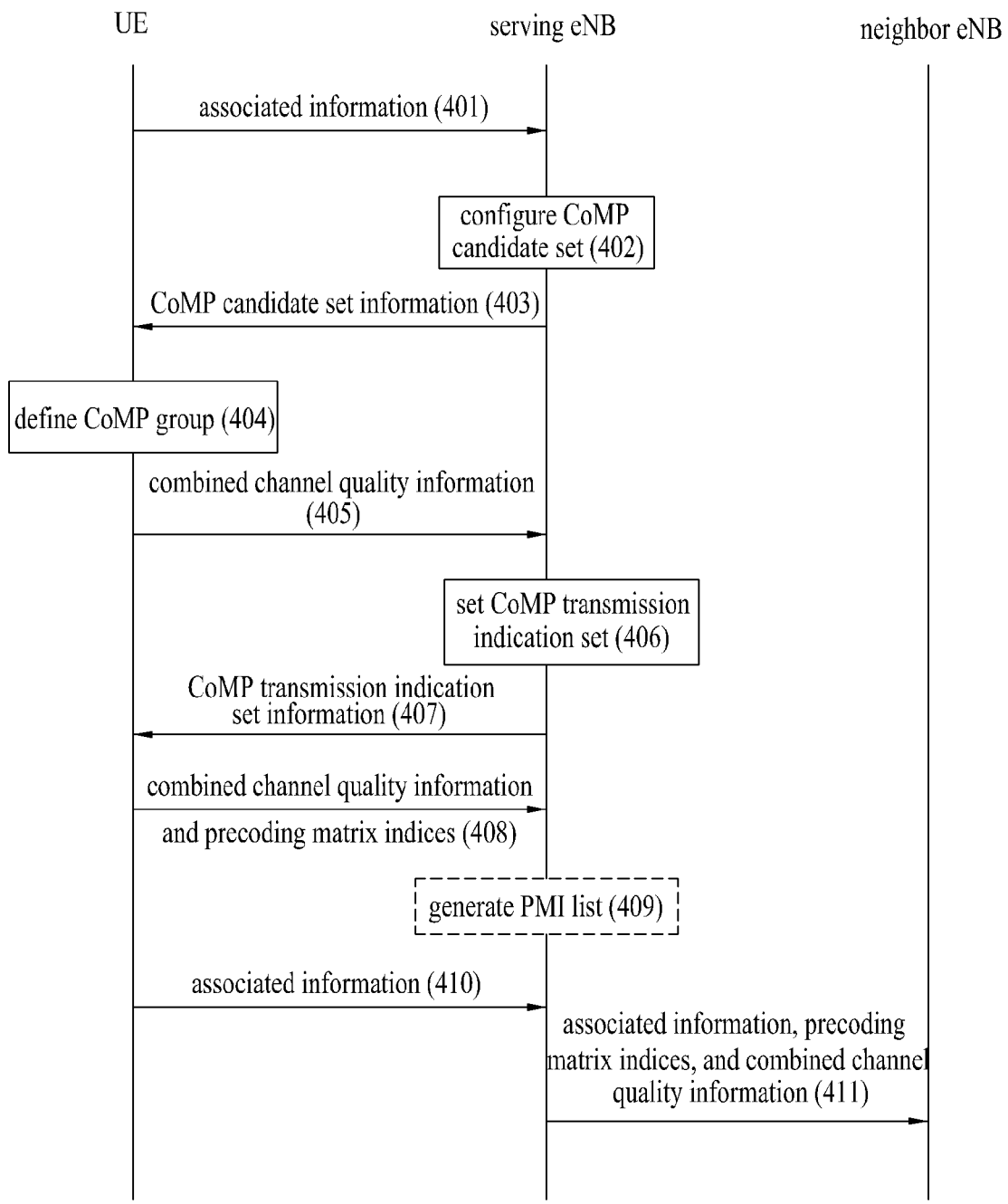
FIG. 4 is a flowchart illustrating a method for setting a CoMP transmission instruction set according to an embodiment of the present invention.

FIG. 4 is a flowchart illustrating a method for setting a CoMP transmission indication set according to an embodiment of the present invention.

First of all, UEs need to have a list of neighbor eNBs. To accomplish this, the UEs receive a neighbor eNB list from their serving eNB or generate a neighbor eNB list through measurements of neighbor eNBs. Then, the UEs perform measurements according to the neighbor eNB list. Specifically, the UEs measure associated information of the neighbor eNBs such as their interference levels. The associated information may include at least one of the values listed in Table 1.

TABLE 1

1  RSRP (Reference Symbol Received Power) of neighbor eNB
2  RSRQ (Reference Symbol Received Quality) of neighbor eNB
3  RSSI (Reference Signal Strength Indicator) of neighbor eNB
4  CINR (Carrier to Interference plus Noise Ratio) or SINR (Signal to Interference Noise Ratio) of neighbor eNB, when recommended PMI is applied to or restricted PMI is excluded for neighbor eNB
5  PD (Propagation Delay) from neighbor eNB
6  Improved CINR or SINR of serving eNB, when recommended PMI is applied to neighbor eNB or when restricted PMI is excluded for neighbor eNB Referring to FIG. 4, the UEs report associated information required to configure a CoMP candidate set to the serving eNB in step 401. The associated information may include one or more measurements among the measurements of neighbor eNBs described above and the Identifications (IDs) (or cell IDs) of the neighbor eNBs.

Subsequently, in step 402, the serving eNB selects one or more neighbor eNBs that are to be included in the CoMP candidate set according to a predetermined condition using the associated information and IDs of the eNBs received in step 401. Then, in step 403, the serving eNB transmits information regarding the neighbor eNBs included in the CoMP candidate set to the UE. That is, the serving eNB transmits eNB IDs of the neighbor eNBs selected in step 402 to the UE to allow the UE to determine which neighbor eNBs are included in the CoMP candidate set.

In step 404, the UE identifies (or defines) the neighbor eNBs included in the CoMP candidate set as a CoMP group including a preset number of eNBs. As described above, the preset number of eNBs is the number of eNBs that operate in a joint processing mode and includes the serving eNB.

Then, in step 405, the UE measures combined channel quality information of each group identified in step 404 and transmits the measured combined channel quality information to the serving eNB. Here, it is preferable that the combined channel quality information ($CQI_c$) be measured using the following Expression 5.

$$CQI_c = \frac{|h_1 + h_2 + \ldots + h_n|^2}{N + \sum_{\substack{k=0 \\ k=1,2,\ldots,n}}^{M} I_k} \quad \text{[Expression 5]}$$

Here, $|h_1 + h_2 + \ldots + h_n|^2$ or $|h_c|^2$ is combined channel information corresponding to a corresponding CoMP group and N is noise received by the UE. In addition, $$\sum_{\substack{k=0 \\ k=1,2,\ldots,n}}^{M} I_k$$

is the sum of interferences between the UE and eNBs excluding the eNBs included in the corresponding CoMP group from among the eNBs of the CoMP candidate set.

In step 406, the serving eNB sets a CoMP group which is more appropriate for the joint processing mode from among groups identified in step 404 based on received combined channel quality information values. This is because a combination of the channels between the UE and the eNBs, rather than each of the channels between the UE and the eNBs, reflects an actual data transmission path of the joint processing mode as described above.

Then, in step 407, the serving eNB transmits information regarding eNBs included in the CoMP transmission indication set to the UE. In step 408, the UE measures precoding matrix indices (PMIS) corresponding respectively to the neighbor eNBs included in the CoMP transmission indication set and transmits the measured precoding matrix indices to the serving eNB. More preferably, the UE may transmit corresponding combined channel quality information together with each precoding matrix index to the serving eNB.

When the serving eNB has received the precoding matrix indices corresponding respectively to the neighbor eNBs included in the CoMP transmission indication set, the serving eNB performs a first selection procedure in step 409. That is, the serving eNB selects precoding matrix indices to be transmitted to the neighbor eNBs using the frequencies of precoding matrix indices corresponding to the neighbor eNBs and associated information (i.e., interference level information) in the case where the precoding matrix indices are applied and generates a precoding matrix index list (PMI list) including the selected precoding matrix indices.

Associated information that the serving eNB has received when configuring a CoMP candidate set in step 401 does not accurately correctly reflect an interference level that varies with time. Accordingly, UEs may transmit associated information such as an interference level at regular intervals or at irregular intervals or at the request of the serving eNB in step 410 and the serving eNB may update the associated information with that received from the UEs when configuring a CoMP candidate set.

The serving eNB may obtain a statistical value of the updated associated information in order to reduce overhead by reducing the amount of associated information transmitted to the neighbor eNBs. That is, the serving eNB may obtain, as the statistical value, an average, sum, maximum, minimum, variance, or standard deviation of the updated associated information and the associated information received when configuring the CoMP candidate set.

Then, in step 411, the serving eNB transmits both the precoding matrix index list including the precoding matrix indices selected in the first selection procedure of step 409 and associated information values updated in step 405 to each neighbor eNB included in the CoMP transmission indication set. More preferably, instead of transmitting all updated associated information values, the serving eNB may transmit a statistical value of the updated associated information values. In this case, the transmission period of the precoding matrix index and the transmission period of the updated associated information may be equal or different.

Each neighbor eNB performs a second selection procedure which determines a precoding matrix index to be actually applied using the selected precoding matrix indices and the associated information (preferably, a statistical value thereof). That is, even when the neighbor eNB has received precoding matrix indices whose reception frequencies are equal, the neighbor eNB may select a more effective precoding matrix index from among the precoding matrix indices using the updated associated information or statistical value.

Figure 5:
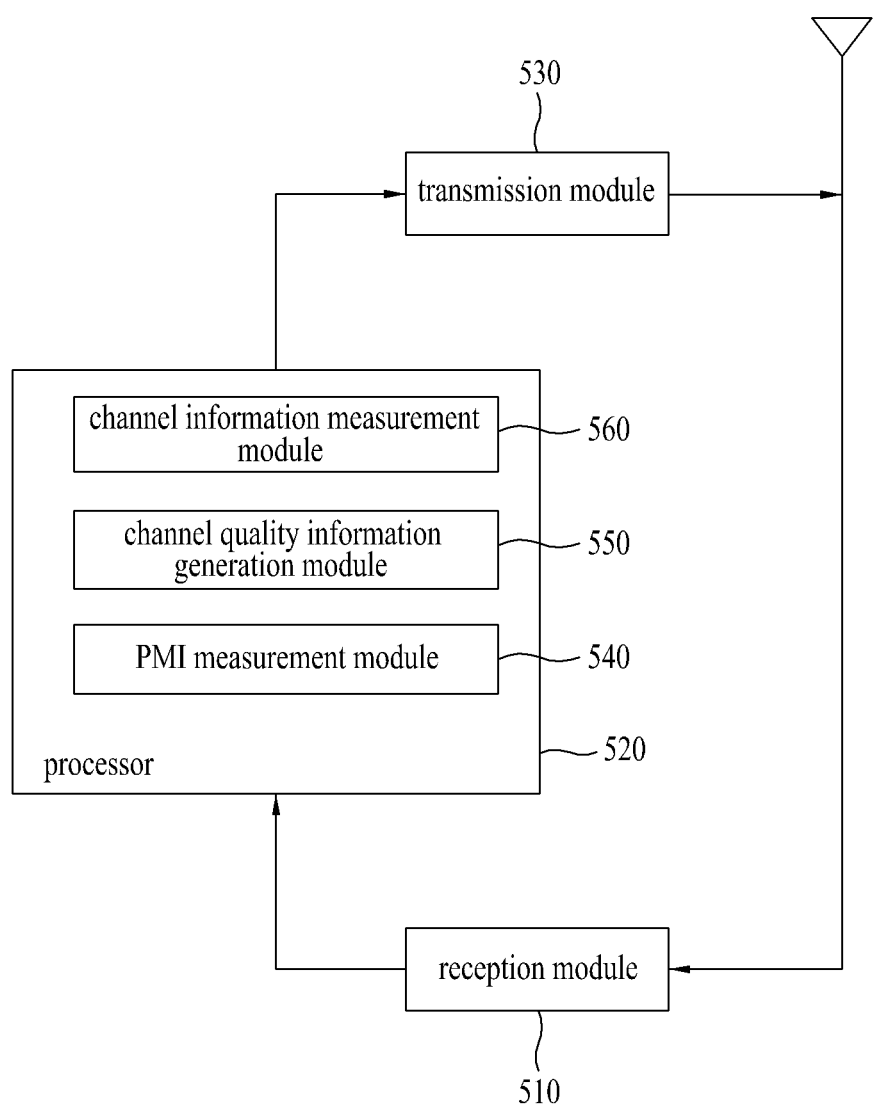
FIG. 5 is a block diagram of a UE apparatus according to an embodiment of the present invention.

FIG. 5 is a block diagram of a UE apparatus according to an embodiment of the present invention.

As shown in FIG. 5, the eNB apparatus includes a reception module 510, a processor 520, and a transmission module 530 and may further include a channel information measurement module 540, a channel quality information generation module 550, and a precoding matrix index (PMI) measurement module 560.

The reception module 510 may receive information regarding eNBs included in a CoMP transmission indication set, a CoMP candidate set, and a CoMP set, in addition to general data transmitted from an eNB. Specifically, the reception module 510 receives signals through the same band from one or more neighbor eNBs and a serving eNB which are included in a CoMP set and operate in a joint processing mode.

The processor 520 controls overall operation of the UE apparatus and identifies (or defines) neighbor eNBs included in the CoMP candidate set as a CoMP group including a preset number of eNBs. As described above, the preset number of eNBs is the number of eNBs that operate in a joint processing mode and includes the serving eNB.

The channel information measurement module 540 included in the processor 520 measures channel information of the UE and eNBs. Specifically, when the wireless communication system operates in the joint processing mode, the channel information measurement module 540 measures combined channel information $|h_1+h_2+ \ldots +h_n|^2$ or $|h_c|^2$ regarding a combination of channels between the UE and a plurality of eNBs.

The channel quality information generation module 550 generates channel quality information using the channel information values measured by the channel information measurement module 540. Specifically, the channel quality information generation module 550 generates combined channel information regarding a plurality of channels. This combined channel information is preferably generated according to Expression 4.

The PMI measurement module 560 included in the processor 520 measures a precoding matrix index that is to be recommended or restricted for each channel between the UE and the eNBs.

The transmission module 530 may transmit channel information and channel quality information to each eNB. When the wireless communication system operates in the joint processing mode, the transmission module 530 transmits the combined channel information generated by the channel quality information generation module 550.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways.

Accordingly, the invention should not be limited to the specific embodiments described herein, but should be accorded the broadest scope consistent with the principles and novel features disclosed herein.

INDUSTRIAL APPLICABILITY

Although the method and apparatus for transmitting channel quality information in a wireless communication system to which a CoMP scheme is applied has been described above with reference to examples which are applied to a 3GPP LTE system, the present invention can also be applied to various mobile communication systems, other than the 3GPP LTE system, to which a similar CoMP scheme is applicable.

The invention claimed is:

1. A method for transmitting channel quality information from a user equipment (UE) in a communication system to which a Coordinated Multi-Point (CoMP) scheme is applied, the method comprising:

receiving signals through an identical band from a serving eNode B (eNB) and one or more neighbor eNBs that are included in a CoMP set and operate in a joint processing mode;

generating combined channel quality information of one signal which combines the signals received through the identical band; and transmitting the combined channel quality information to the serving eNB, wherein the combined channel quality information $CQI_c$ is determined according to, $$CQI_c = \frac{|h_1 + h_2 + \ldots + h_n|^2}{N + \sum_{\substack{k=0 \\ k=1,2,\ldots,n}}^{M} I_k} = \frac{|h_c|^2}{N + \sum_{\substack{k=0 \\ k=1,2,\ldots,n}}^{M} I_k},$$

where $h_1$ is a channel between the UE and the serving eNB, $h_n(n \neq 1)$ is a channel between the UE and one of the one or more neighbor eNBs, $|h_1+h_2+ \ldots +h_n|^2$ or $|h_c|^2$ is combined channel information of a combination of channels between the UE and the serving eNB and the one or more neighbor eNBs included in the CoMP set, N is a noise received by the UE, $I_k$ is interference between the UE and one of the neighbor eNBs not included in the CoMP set, M is a number of neighbor eNBs not included in the CoMP set.

2. The method according to claim 1, wherein the CoMP set is generated by receiving information of a CoMP candidate set including one or more neighbor eNBs from a serving eNB and identifying the neighbor eNBs included in the CoMP candidate set as one or more CoMP sets, each including a preset number of neighbor eNBs.

3. The method according to claim 2, further comprising:

receiving information of a CoMP transmission indication set among the one or more CoMP sets from the serving eNB after transmitting combined channel quality information of the one or more CoMP sets;

measuring precoding matrix indices corresponding respectively to neighbor eNBs included in the CoMP transmission indication set; and transmitting the precoding matrix indices to the serving eNB.

4. The method according to claim 3, wherein the CoMP transmission indication set is a CoMP set that is selected from among the CoMP sets based on the combined channel quality information.

5. A user equipment (UE) apparatus in a communication system to which a Coordinated Multi-Point (CoMP) scheme is applied, the UE apparatus comprising:
- a reception module for receiving signals through an identical band from a serving eNB and one or more neighbor eNBs that are included in a CoMP set and operate in a joint processing mode;
- a processor for generating combined channel quality information of one signal which combines the signals received through the identical band; and
- a transmission module for transmitting the combined channel quality information to the serving eNB,
wherein the combined channel quality information $CQI_c$ is determined according to, $$CQI_c = \frac{|h_1 + h_2 + \ldots + h_n|^2}{N + \sum_{\substack{k=0 \\ k=1,2,\ldots,n}}^{M} I_k} = \frac{|h_c|^2}{N + \sum_{\substack{k=0 \\ k=1,2,\ldots,n}}^{M} I_k},$$

where $h_1$ is a channel between the UE and the serving eNB, $h_n(n \neq 1)$ is a channel between the UE and one of the one or more neighbor eNBs, $|h_1+h_2+ \ldots + h_n|^2$ or $|h_c|^2$ is combined channel information of a combination of channels between the UE and the serving eNB and the one or more neighbor eNBs included in the CoMP set, N is a noise received by the UE, $I_k$ is interference between the UE and one of the neighbor eNBs not included in the CoMP set, M is a number of neighbor eNBs not included in the CoMP set.

* * * * *